United States Patent
Mo et al.

(10) Patent No.: US 9,769,690 B2
(45) Date of Patent: Sep. 19, 2017

(54) METHOD FOR MEASURING DISCOVERY SIGNAL, BASE STATION, AND TERMINAL

(71) Applicant: ZTE CORPORATION, Shenzhen, Guandong Province (CN)

(72) Inventors: Linmei Mo, Shenzhen (CN); Yajun Zhao, Shenzhen (CN); Hanqing Xu, Shenzhen (CN); Yonghong Gao, Shenzhen (CN); Aijun Cao, Shenzhen (CN)

(73) Assignee: ZTE Corporation (CN)

( * ) Notice: Subject to any disclaimer, the term of this patent is extended or adjusted under 35 U.S.C. 154(b) by 0 days.

(21) Appl. No.: 15/006,493

(22) PCT Filed: Jun. 19, 2014

(86) PCT No.: PCT/CN2014/080273
§ 371 (c)(1),
(2) Date: Jan. 26, 2016

(87) PCT Pub. No.: WO2015/010510
PCT Pub. Date: Jan. 29, 2015

(65) Prior Publication Data
US 2016/0212647 A1    Jul. 21, 2016

(30) Foreign Application Priority Data
Jul. 26, 2013    (CN) .......................... 2013 1 0319612

(51) Int. Cl.
*H04W 72/00* (2009.01)
*H04W 48/16* (2009.01)
(Continued)

(52) U.S. Cl.
CPC .......... *H04W 24/08* (2013.01); *H04W 48/12* (2013.01); *H04W 48/16* (2013.01)

(58) Field of Classification Search
CPC ..... H04L 5/0048; H04L 5/0053; H04L 5/001; H04W 84/045; H04W 24/10;
(Continued)

(56) References Cited

U.S. PATENT DOCUMENTS

| | | | |
|---|---|---|---|
| 2004/0166886 A1 | 8/2004 | Laroia et al. | |
| 2014/0254429 A1* | 9/2014 | Wang | H04L 5/0037 370/254 |

(Continued)

FOREIGN PATENT DOCUMENTS

| | | |
|---|---|---|
| CN | 101873629 A | 10/2010 |
| CN | 101877865 A | 11/2010 |

(Continued)

OTHER PUBLICATIONS

ETRI: "Discussion on small-cell discovery", 3GPP TSG RAN WG1 Meeting #72bis, Chicago, USA, Apr. 15-19, 2016, R1-131141.
(Continued)

*Primary Examiner* — Allahyar Kasraian
(74) *Attorney, Agent, or Firm* — Plumsea Law Group, LLC

(57) ABSTRACT

A discovery signal measurement method, base station and terminal, wherein the method includes: a base station determining measurement patterns used by different terminals for measuring discovery signals according to transmission patterns of discovery signals; the base station configuring measurement patterns corresponding to the terminals for the terminals; the base station transmitting the discovery signals in cells corresponding to the transmission pattern according to the transmission patterns. The method, base station and terminal according to the embodiment of the present invention provide a definite solution for configuring measurement patterns of discovery signals.

19 Claims, 5 Drawing Sheets

(51) Int. Cl.
*H04W 24/08* (2009.01)
*H04W 48/12* (2009.01)

(58) Field of Classification Search
CPC ..... H04W 24/02; H04W 24/08; H04W 48/20; H04W 48/12; H04W 48/10; H04W 48/08
USPC .................. 455/450–455; 370/329, 345–350
See application file for complete search history.

(56) References Cited

U.S. PATENT DOCUMENTS

| | | | |
|---|---|---|---|
| 2014/0302856 A1* | 10/2014 | Nory ..................... | H04W 48/10 455/437 |
| 2015/0223147 A1* | 8/2015 | Fujishiro ............... | H04W 8/005 370/329 |
| 2015/0327097 A1* | 11/2015 | Chai ..................... | H04W 24/08 370/252 |
| 2016/0212647 A1 | 7/2016 | Mo et al. | |

FOREIGN PATENT DOCUMENTS

| | | |
|---|---|---|
| CN | 102377531 A | 3/2012 |
| JP | 2011511551 A | 4/2011 |
| JP | 2012235318 A | 11/2012 |
| WO | 2012099939 A1 | 7/2012 |
| WO | 2012150894 A1 | 11/2012 |

OTHER PUBLICATIONS

European Search Report issued May 18, 2016 in European Patent Application No. 14829870.6.
International Search Report and Written Opinion mailed Sep. 24, 2014 in PCT/CN2014/080273.
Canadian Office Action issued Jan. 13, 2017 for Canadian Application No. 2919354 (3pp).

* cited by examiner

METHOD FOR MEASURING DISCOVERY SIGNAL, BASE STATION, AND TERMINAL

CROSS-REFERENCE TO RELATED APPLICATION(S)

This application is the U.S. National Phase application of PCT application number PCT/CN2014/080273 having a PCT filing date of Jun. 19, 2014, which claims priority of Chinese patent application 201310319612.2 filed on Jul. 26, 2013, the disclosures of which are hereby incorporated by reference.

TECHNICAL FIELD

The present document relates to the field of discovery signal measurement, and more particularly, to a method for measuring discovery signals, base station and terminal in a small cell system.

BACKGROUND OF THE RELATED ART

The small cell technology uses low-power wireless access nodes to extend the coverage range of a macro cell, distributes growing data flow of the macro cell, and increases the utility efficiency of radio spectrum resources. The LTE-Advanced system uses this technology to increase network capacity.

Typically, the Small Cell has a small size, and its coverage range is between 10 meters to 2 kilometers. The Small Cell deployment scenario in the LTE network is composed of two levels: macro cell and small cell. The macro cell and the small cell can be deployed at the same frequency point, that is, co-channel deployment; or they can be deployed at different frequency points, that is, non-co-channel deployment; alternatively, the macro cell may not be deployed, and only the small cell is deployed. The small cell can be deployed in indoor environments and outdoor environments. It may be deployed sparsely or densely.

The Small Cell is an interference-limited system, there are complex interference relationships between the macro cell and micro cell, as well as between the micro cell and the micro cell. Each cell dynamically schedules to serve terminals within the cell. In addition, as the UE moves, there are UEs continuously moving in and moving out of the small cell, the load and interference of the Small Cell system will show a significant fluctuation. Therefore, it must adopt a certain interference coordination method, such as small cell adaptive switching mechanism and adaptive power adjustment mechanism, to suppress and coordinate the interference in the Small Cell.

The basic idea of the small cell adaptive switching mechanism is adaptively opening or closing some small cells with very low load to reduce inter-cell interference. An opened cell is called an activated cell, and a closed cell is called a dormant cell. The activated cell normally transmits data channels and common channels; the dormant cell closes data channels and some of common channels. However, both the activated cell and the dormant cell can transmit the cell discovery signal (DS) that is used for the cell discovery and selection, activation/deactivation judgment, and so on. The discovery signal is still under discussion, currently there are several viewpoints: 1) following the traditional PSS/SSS/CRS (Primary/Secondary Synchronization Signal, Cell-specific reference signals) signal; 2) using the modified PSS/SSS/CRS signal; and 3) using a new DS.

The UE detects the DS of the activated cell and the dormant cell to discover and select a cell. For a dormant cell, if there is a UE detecting the discovery signal of a cell, it indicates that there are UEs existing under the coverage of the cell, and it may consider to activate the cell in order to serve these UEs. For an activated cell, if the UE detects the DS signal of a cell, if the DS signal of the cell is stronger than the DS signal of the current serving cell, it may consider switching to the cell; or although the DS signal of the cell is equivalent to or relatively weaker than the DS signal of the current serving cell, but for the load balancing consideration, if necessary, it may also consider switching to the cell. Therefore, the DS measurement is very important for operations such as discovery, selection, activation and deactivation of a small cell system. The DS measurement method can be a presence/absence detection, namely 0/1 detection, and it takes how many times it is detected within a certain time period as a measurement value; it can be a quantitative detection, that is, the RSRP (Reference Signal Receiving Power) detection/RSRQ (Reference Signal Receiving Quality) detection/SINR (Signal to Interference plus Noise Ratio) detection that takes the DS signal intensity or signal quality as the measurement quantity.

There are different measurement needs for performing the DS presence/absence detection and the DS intensity detection, the number of samples required in the presence/absence detection is small, while the number of samples required in the intensity detection is large and the filtering time is longer, that is to say, the presence/absence detection and the intensity detection need to use different measurement patterns. In addition, for a scenario in which the Small Cells are deployed at different frequencies, the UE needs to carry out an inter-frequency detection on the DS of the inter-frequency cells. In the Measurement Gap of an inter-frequency detection, the UE needs to switch to a measurement frequency point different from its working frequency point, at this time it needs to stop transmitting data temporarily. From the viewpoint of spectrum efficiency, it should shorten the measurement gap as much as possible. Currently the DS measurement is still under discussion, and different measurement patterns are not provided for these different measurement needs in the related art. Therefore, it is necessary to study a method for configuring measurement patterns of discovery signals.

SUMMARY OF THE INVENTION

To solve the technical problem, the embodiment of the present invention is to provide a measurement method for discovery signals, base station and terminal to solve the technical problem that the solution for configuring measurement patterns of relevant discovery signals is not definite.

To solve the abovementioned technical problem, the following technical solution is used:

the embodiment of the present invention provides a method for measuring discovery signals, wherein the method comprises:

a base station determining measurement patterns used for measuring discovery signals for different terminals according to transmission patterns of discovery signals of one or more cells;

the base station configuring measurement patterns corresponding to the terminals for different terminals; and the base station transmitting the discovery signals in cells corresponding to the transmission patterns, and the terminals measuring the discovery signals according to the configured measurement patterns.

Alternatively, before the step of the base station determining measurement patterns used for measuring discovery signals for different terminals according to transmission patterns of the discovery signals of one or more cells, the method further comprises:

the base station determining the transmission patterns through any of the following methods:

the base station determining independently; or, receiving a configuration signaling sent by a central node base station or other base stations other than the central node base station, configuring the transmission patterns according to the configuration signaling, wherein the transmission patterns are centrally determined by the central node base station, or determined coordinately by the central node base station and other base stations other than the central node base station.

Alternatively, the transmission pattern indicates that a transmission mode of the discovery signals comprises:

continuously transmitting discovery signals according to a predetermined transmission cycle; or;

transmitting a predetermined number of bursts in one cycle, and transmitting a predetermined number of subframes carrying the discovery signals in each burst, and a gap between adjacent bursts is a predetermined value.

Alternatively, transmission patterns of different cells meet at least one the following situations:

the transmission pattern corresponding to an activated cell and the transmission pattern corresponding to a dormant cell are the same, and both indicate that the discovery signals are transmitted intermittently;

the transmission pattern corresponding to an activated cell indicates that the discovery signals are transmitted continuously, the transmission pattern corresponding to a dormant cell indicates that the discovery signals are transmitted intermittently;

the transmission pattern corresponding to an activated cell and the transmission pattern corresponding to a dormant cell are different, and both indicate that the discovery signals are transmitted intermittently; and transmission patterns of the corresponding different cells indicate that starting position offsets of starting to transmit the discovery signals are different.

Alternatively, the transmission patterns being different means that at least one of the following information in the transmission patterns is different:

the cycle of transmitting discovery signals in the corresponding cell;

the number of bursts transmitted in each cycle;

the number of subframes carrying the discovery signals transmitted in each burst;

a gap between adjacent bursts;

starting position offset of starting to transmit the discovery signals; and occupied frequency resources and/or sequence resources.

Alternatively, the step of the base station determining measurement patterns used for measuring discovery signals for different terminals according to transmission patterns of discovery signals of one or more cells comprises: the base station determining measurement patterns of the terminals based on measurement needs, and the measurement needs comprise qualitative measurement needs and/or quantitative measurement needs.

Alternatively, the measurement patterns of the terminals comprise measurement patterns used for measuring discovery signals of one or more cells, and the measurement patterns used by the terminals for measuring discovery signals of one cell are the full set or subset of transmission patterns used by the base station for transmitting the discovery signals of the cell.

The embodiment of the present invention further provides a method for measuring discovery signals, wherein the method comprises:

a terminal receiving a measurement pattern configuration transmitted by a base station for measuring discovery signals, wherein the measurement pattern is determined by the base station according to transmission patterns of discovery signals of one or more cells; and the terminal measuring the discovery signals based on the measurement pattern.

Alternatively, the measurement pattern of the terminal comprises information used for measuring discovery signals of all cells corresponding to the base station.

Alternatively, measurement patterns of different terminals comply with at least one of the following situations:

in an intra-frequency measurement, measurement patterns of different terminals are the same;

in an inter-frequency measurement, measurement patterns of different terminals are the same;

in the intra-frequency measurement, measurement patterns of different terminals are different, and measured bursts or subframes are staggered from each other in one cycle; and in the inter-frequency measurement, measured bursts or subframes of the measurement patterns of different terminals in one cycle are staggered from each other.

Alternatively, the measurement pattern comprises information used for indicating the following content:

the number of bursts measured in each cycle, the number of subframes carrying the discovery signals measured in each burst; the number of cycles of measurement needed for reporting a measurement result.

The embodiment of the present invention provides a base station, wherein the base station comprises: a measurement pattern determination module, a measurement pattern configuration module, and a discovery signal transmission module, wherein, the measurement pattern determination module is configured to: determine measurement patterns used for measuring discovery signals for different terminals according to transmission patterns of discovery signals of one or more cells;

the measurement pattern configuration module is configured to: configure measurement patterns corresponding to the terminals for different terminals; and the discovery signal transmission module is configured to: transmit the discovery signals in the cells corresponding to the transmission patterns.

Alternatively, the base station is further configured to determine a transmission pattern through any of the following methods:

the base station determining independently; or, receiving a configuration signaling sent by a central node base station or other base stations other than the central node base station, configuring the transmission pattern according to the configuration signaling, wherein the transmission pattern is centrally determined by the central node base station, or determined coordinately by the central node base station and other base stations other than the central node base station.

Alternatively, the transmission pattern indicates that a transmission mode of the discovery signal comprises:

continuously transmitting the discovery signals according to a predetermined transmission cycle; or;

transmitting a predetermined number of bursts in one cycle, transmitting a predetermined number of subframes carrying discovery signals in each burst, and a gap between adjacent bursts is a predetermined value.

Alternatively, transmission patterns of different cells comply with at least one the following situations:

the transmission pattern corresponding to an activated cell and the transmission pattern corresponding to a dormant cell are the same, and both indicate that the discovery signals are transmitted intermittently;

the transmission pattern corresponding to an activated cell indicates that the discovery signals are transmitted continuously, the transmission pattern corresponding to a dormant cell indicates that the discovery signals are transmitted intermittently;

the transmission pattern corresponding to an activated cell and the transmission pattern corresponding to a dormant cell are different, and both indicate that the discovery signals are transmitted intermittently; and transmission patterns of corresponding different cells indicate that starting position offsets of starting to transmit the discovery signals are different.

Alternatively, the transmission patterns being different means that at least one of the following information in the transmission patterns is different:

a cycle of transmitting discovery signals in the corresponding cell;

the number of bursts transmitted in each cycle;

the number of subframes carrying the discovery signals transmitted in each burst;

a gap between adjacent bursts;

starting position offset of starting to transmit the discovery signals; and occupied frequency resources and/or sequence resources.

Alternatively, the base station is configured to determine measurement patterns used for measuring discovery signals for different terminals according to transmission patterns of discovery signals of one or more cells: determining measurement patterns of the terminals based on measurement needs, wherein the measurement needs comprise qualitative measurement needs and/or quantitative measurement needs.

Alternatively, the measurement patterns of the terminals comprise measurement patterns used for measuring discovery signals of one or more cells, and measurement patterns used by the terminals for measuring discovery signals of one cell are the full set or subset of transmission patterns used by the base station for transmitting the discovery signals of the cell.

The embodiment of the present invention further provides a terminal, wherein the terminal comprises: a configuration reception module and a discovery signal measurement module, wherein, the configuration reception module is configured to: receive a measurement pattern configuration transmitted by a base station for measuring the discovery signals, wherein the measurement pattern is determined by the base station according to transmission patterns of discovery signals of one or more cells; and the discovery signal measurement module is configured to: measure discovery signals based on the measurement patterns.

Alternatively, the measurement patterns of the terminals comprise information used for measuring discovery signals of all cells corresponding to the base station.

Alternatively, the measurement patterns of different terminals comply with at least one of the following situations:

in an intra-frequency measurement, measurement patterns of different terminals are the same;

in an inter-frequency measurement, measurement patterns of different terminals are the same;

in the intra-frequency measurement, measurement patterns of different terminals are different, measured bursts or subframes in one cycle are staggered from each other; and in the inter-frequency measurement, measured bursts or subframes of the measurement patterns of different terminals in one cycle are staggered from each other.

Alternatively, the measurement pattern comprises information used for indicating the following content:

the number of bursts measured in each cycle, the number of subframes carrying the discovery signals measured in each burst; the number of cycles of measurement needed for reporting a measurement result.

Compared to the related art, the discovery signal measurement method, base station and terminal in the embodiment of the present invention provide a definite implementation solution for determining measurement patterns used by terminals for measuring discovery signals according to the transmission patterns of the discovery signals and configuring the terminals with measurement patterns, so as to facilitate the terminals measuring the discovery signals transmitted by each base station and to meet the measurement needs of the terminals.

BRIEF DESCRIPTION OF THE DRAWINGS

FIG. 1

PREFERRED EMBODIMENTS OF THE INVENTION

Figure 1:
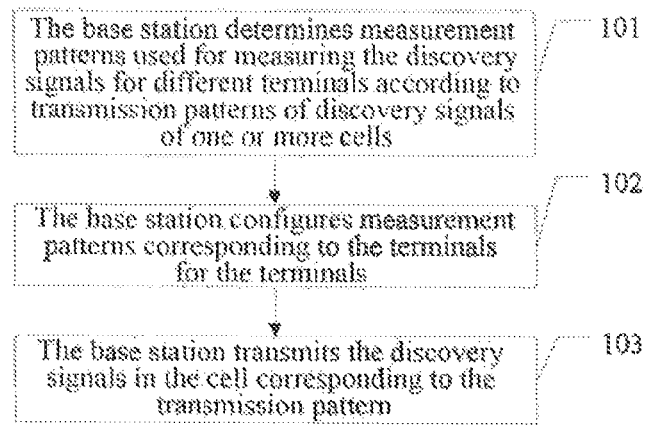
FIG. 1 is a schematic diagram of a first discovery signal measurement method embodiment in accordance with the present invention.

Hereinafter, in conjunction with the accompanying drawings and specific embodiments, the technical solution of the present document will be described in detail to enable those skilled in the art to better understand and implement the patent document, but the cited examples are not intended to limit the patent document. It should be noted that, in the case of no conflict, embodiments and features in the embodiments of the present application can be combined with each other.

The discovery signal measurement method in the embodiment of the present invention mainly relates to the base station and the terminal, and in the following, embodiments of the present invention will be described respectively from two different perspectives of base station and terminal:

The First Embodiment

The embodiment of the present invention provides a discovery signal measurement method embodiment, wherein the method comprises:

in step 101: the base station determines measurement patterns used for measuring the discovery signals for different terminals according to transmission patterns of discovery signals of one or more cells;

it should be noted that, for brevity, the embodiment of the present invention is also described as a cell receiving or transmitting patterns, it should be understood that the true meaning of the cell herein is a base station corresponding to the cell.

The base station described in the embodiment of the present invention comprises a variety of base stations such as macro base stations and home base stations. Under different network standards or network environments, the number of cells corresponding to one base station is different, which is not limited in the embodiment of the present invention.

Discovery signals are distinguished through cells, that is, transmission patterns of discovery signals of a plurality of cells under the same base station can also be configured as different.

The transmission pattern is determined through any of the following methods:

(1) the base station determining independently; or, (2) receiving a configuration signaling sent by a central node base station or other base stations other than the central node base station, configuring the transmission pattern according to the configuration signaling, wherein the transmission pattern is centrally determined by the central node base station, or determined coordinately by the base station and other base stations.

Specifically, the signaling configuration methods comprise the following two:

a) centralization (having a central node base station): a central node base station exists within the network, and configures the transmission pattern of the base station after coordinating multiple base stations; and b) distribution (no central node base station, relationships between all the base stations are equal): a plurality of base stations in the network distributively and coordinatively determine the transmission pattern, one of the base stations participating in the coordination configures the transmission pattern of the base station.

Alternatively, the transmission pattern indicates that transmission modes of the discovery signal comprise:

transmission mode 1: continuously transmitting discovery signals according to a predetermined transmission cycle; or;

transmission mode 2: transmitting a predetermined number of bursts in one cycle, transmitting a predetermined number of subframes carrying the discovery signals in each burst, and a gap between adjacent bursts is a predetermined value.

For the transmission mode 1, it only needs to configure the transmission cycle T.

Figure 2:
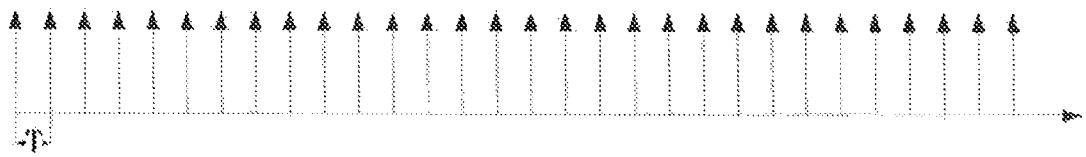
FIG. 2 is a schematic diagram of a transmission pattern in a continuous transmission solution, wherein the discovery signals are transmitted according to a fixed cycle T.

As shown in FIG. 2, the cell transmits the discovery signals at the interval of cycle T, i.e. transmits the discovery signals at the time points of 0, T, 2T, . . . , NT, (N+1) T, (N+2) T, . . . , 2NT, (2N+1) T, (2N+2) T, . . . .

For example, for the case that the DS uses the conventional PSS/SSS/CRS signal, T may be an integer multiple of a conventional PSS/SSS/CRS signal transmission cycle T0, for example, the transmission cycle of PSS is 5 ms, then the transmission cycle of DS is equal to T0 or an integer multiple of T0, for example, it can take 5 ms, 10 ms, 20 ms, and so on. For a newly designed DS, the value of T is more flexible, for example, it can take 2 ms, 5 ms, 10 ms, 50 ms, 100 ms and so on.

Accordingly, the transmission mode 2 refers to transmitting the discovery signals according to the cycle N*T, L bursts are transmitted in each cycle, and each burst comprises M subframes carrying the discovery signals, and the gap between adjacent bursts is P*T.

The transmission pattern corresponding to an activated cell and the transmission pattern corresponding to a dormant cell are the same, and both indicate that the discovery signals are transmitted intermittently;

the transmission pattern corresponding to an activated cell indicates that the discovery signals are transmitted continuously, and the transmission pattern corresponding to a dormant cell indicates that the discovery signals are transmitted intermittently;

the transmission pattern corresponding to an activated cell and the transmission pattern corresponding to a dormant cell are different, and both indicate that the discovery signals are transmitted intermittently; and transmission patterns of the corresponding different cells indicate that starting position offsets of starting to transmit the discovery signals are different.

The transmission patterns of different cells comply with at least one of the following situations:

the transmission patterns being different refers to that at least one of the following information in the transmission patterns is different:

a cycle of transmitting discovery signals in the corresponding cell;

the number of bursts transmitted in each cycle;

the number of subframes carrying the discovery signals transmitted in each burst;

a gap between adjacent bursts;

starting position offset of starting to transmit the discovery signal;

occupied frequency resources and/or sequence resources.

The occupied frequency resources refer to the case in which the discovery signals use the CRS or other discovery signals whose bandwidth is variable, it may configure that different cells occupy different frequency resources for transmitting discovery signals in the frequency domain, for example, CRS sequences transmitted by some cells are long and occupy a lot of frequency resources (bandwidth), while the frequency resources (bandwidth) occupied by the CRS of some cells are less, meanwhile, when the frequency resources change, the sequence resources change correspondingly, thus it also needs to be instructed.

In the Small Cell scenario, there are multiple small cells, in order to discover and select a cell, it needs to transmit cell Discovery Signals, there are different restrictions for the activated cell and dormant cell transmitting the DS signals. The UE needs to detect the cell discovery signals to assist the network side to perform the activation/deactivation of a dormant cell, and select an activated cell. The UE can perform a presence/absence detection and/or a quantitative detection of the discovery signals, the two detections have different measurement needs for the DS measurement patterns, and the measurement needs mainly refer to the needs for the measurement type and/or the measurement quantity, that is, qualitative measurement needs and/or quantitative measurement needs, wherein, the quantitative measurement needs may also comprise the measurement intensity needs. Thus, alternatively, the base station determines the measurement pattern of the terminal based on the measurement needs, and the measurement needs comprise qualitative measurement needs and/or quantitative measurement needs.

In step 102: the base station configures measurement patterns corresponding to the terminals for different terminals;

the measurement patterns of the terminals comprises measurement patterns used for measuring discovery signals of one or more cells, and the measurement patterns used by the terminals for measuring the discovery signals of one cell are a full set or subset of transmission patterns used by the base station for transmitting the discovery signals of the cell.

The measurement patterns of the terminals comprise information used for measuring the discovery signals of all cells corresponding to the base station, so as to ensure that each cell has discovery signals falling within the gap of measurement pattern of terminal, so that the UE may discover each cell, so as to avoid undetected cells.

After each cell determines the transmission patterns of the discovery signals, it starts to transmit discovery signals according to the pattern, and the UE can measure the discovery signals of each cell. The base station can configure different measurement patterns according to the UE's different measurement needs, and the measurement needs comprise qualitative measurement needs and/or quantitative measurement needs. The measurement patterns for a UE measuring the DS of a cell should be a full set or subset of the DS transmission patterns of the cell. The DS measurement pattern may be UE specific, that is, each UE can be configured with different measurement patterns.

For the intra-frequency measurement, each UE can be configured to use the same measurement pattern for measuring, because the UE does not need to stop the data transmission temporarily in the intra-frequency measurement, and the spectral efficiency will not be affected; and for the UE in the inter-frequency measurement, because the measurement needs to stop the data transmission temporarily, it should make its measurement patterns staggered from each other as much as possible to avoid that a large number of UEs stop transmitting at the same time so as to reduce the spectral efficiency.

For the intra-frequency measurement, different UEs can be configured to use the same measurement pattern for measuring.

For the inter-frequency measurement, different UEs are configured to use different measurement patterns for measuring as much as possible, and the measurement patterns of the respective UEs are staggered as much as possible, to avoid that the respective UEs stops transmitting simultaneously in the measurement gap.

For each UE, it may be configured with the number of bursts measured within each cycle (L1 is an arbitrary integer less than or equal to L), and the number of subframes carrying the discovery signals measured in each burst (M1 is an arbitrary integer less than or equal to M), the starting measurement frame number, and reporting one measurement result after measuring for S cycles.

There are different measurement needs for the UE performing a presence/absence detection and intensity detection of the DS, and the number of samples required in the presence/absence detection is relatively small, while the number of samples required by the intensity detection is relatively large and the filtering time is longer.

Considering that the transmission pattern of the discovery signals in the to-be-measured cell 1 is configured as the minimum transmission gap T, the transmission cycle N (the actual cycle is N*T), the number of bursts transmitted in each cycle L, the number of subframes carrying the discovery signals in each burst M, the gap P between adjacent bursts (the actual gap is P*T).

For each UE, it can be configured with the number of bursts measured within each cycle (L1 is an arbitrary integer less than or equal to L), the number of subframes carrying the discovery signals measured in each burst (M1 is an arbitrary integer less than or equal to M), and reporting one measurement result after measuring for S cycles.

Alternatively, each UE can be configured to measure different bursts or subframes within one cycle to achieve the purpose that the measurement patterns of the respective UEs are staggered from each other.

The measurement patterns of different terminals comply with at least one of the situations:

in the intra-frequency measurement, the measurement patterns of different terminals are the same;

in the inter-frequency measurement, the measurement patterns of different terminals are the same;

in the intra-frequency measurement, measurement patterns of different terminals are different, and bursts or sub-frames measured in one cycle are staggered from each other;

in the inter-frequency measurement, the measured bursts or subframes of the measurement patterns of different terminals in one cycle are staggered from each other.

The measurement patterns comprise information indicating the following content:

the number of bursts measured in each cycle, the number of subframes carrying the discovery signals measured in each burst, the number of cycles of measurement needed for reporting a measurement result.

In step 103: the base station transmits the discovery signals in the cell corresponding to the transmission pattern; the terminal measures the discovery signals according to the configured measurement pattern.

In the embodiment of the present invention, step 102 and step 103 do not have a strict order.

The method used in the embodiment of the present invention can configure different cells using different DS transmission patterns to adapt different power constraint conditions of the respective cells while avoiding the interference between the respective cells, meeting the UE's different measurement needs. The UE is configured to use the UE specific measurement pattern, such that the measurement GAPs of respective UEs are staggered from each other, compared with the related art, it avoids that all the UEs stop transmitting at the same time and improves the spectral efficiency.

The activated cell and the dormant cell can use the same transmission pattern. Each cell can select a different transmission pattern according to the situation of the present cell, for example, the power constraint condition of an activated cell is relatively loose and the activated cell can be configured to transmit the complete set of signals, such as using the transmission pattern of continuous transmission; the dormant cell can be configured to transmit the subset of the DS of the activated cell for energy saving considerations, for example, using the transmission pattern of intermittent transmission.

Hereinafter, in conjunction with the accompanying drawings and application examples, the transmission pattern is described in detail:

Application Example 1

The activated cell and the dormant cell are configured to use a transmission pattern of continuously transmitting the discovery signals, and the parameter required to be configured is: transmission cycle T.

According to the abovementioned parameter configuration, as shown in FIG. 2, the activated cell and the dormant cell transmit the discovery signals at the time points of 0, T, 2T, . . . , NT, (N+1)T, (N+2)T, . . . , 2NT, (2N+1)T, (2N+2)T, . . . .

In this application example, the advantages of the transmission pattern of the discovery signals are simple configuration and transmission, and the traditional signals only need to be directly multiplexed.

Application Example 2

The activated cell and the dormant cell are configured to use a transmission pattern of intermittently transmitting the discovery signals, and the parameters required to be configured are: minimum transmission gap T, transmission cycle N (the actual cycle is N*T), the number of bursts transmitted in each cycle L, the number of subframes carrying the discovery signals in each burst M, the gap between adjacent bursts P (the actual gap is P*T).

Figure 3:
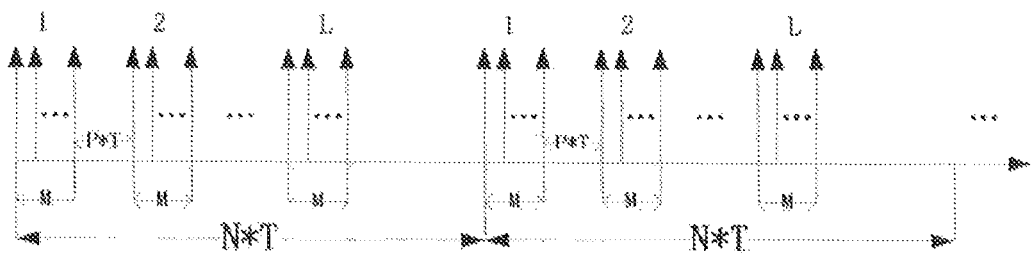
FIG. 3 is a schematic diagram of a transmission pattern of transmitting discovery signals according to the fixed cycle T and transmitting M bursts in each cycle T.

According to the abovementioned parameter configuration, as shown in FIG. 3,
the transmission patterns of the discovery signal of the activated cell and the dormant cell are:
within the first cycle 0~NT:
the first burst starts, from the time point of 0: transmitting the discovery signals at the time points of 0, T, 2T, . . . , MT;
the second burst starts, from the time point of (M+P)T: transmitting the discovery signals at the time points of (M+P)T, (M+P)T+T, (M+P)T+2T, . . . , and (M+P)T+MT;
the L-th burst starts, from the time point of (L−1)(M+P)T: transmitting the discovery signals at the time points of (L−1)(M+P)T, (L−1)(M+P)T+T, (L−1)(M+P)T+2T, . . . , and (L−1)(M+P)T+MT;
within the second cycle NT~2NT:
the first burst starts, from the time point of NT: transmitting the discovery signal at the time points of NT, NT+T, NT+2T, . . . , NT+MT;
the second burst starts, from the time point of NT+(M+P)T: transmitting the discovery signal at the time points of NT+(M+P) T, NT+(M+P)T+T, NT+(M+P)T+2T, . . . , and NT+(M+P)T+MT;
the L-th burst starts, from the time point of NT+(L−1)(M+P)T: transmitting the discovery signal at the time points of NT+(L−1) (M+P)T, NT+(L−1)(M+P)T+T, NT+(L−1)(M+P)T+2T, . . . , NT+(L−1)(M+P)T+MT;
within the k-th cycle (k−1)NT~kNT:
the first burst starts, from the time point of NT: transmitting the discovery signal at the time pints of (k−1)NT, (k−1)NT+T, (k−1)NT+2T, . . . , (k−1)NT+MT;
the second burst starts, from the time point of (k−1)NT+(M+P)T: transmitting the discovery signal at the time points of (k−1)NT+(M+P)T, (k−1)NT+(M+P)T+T, (k−1)NT+(M+P)T+2T, . . . , (k−1)NT+(M+P)T+MT;

the L-th burst starts, from the time point of (k−1)NT+(L−1)(M+P)T: transmitting the discovery signal at the time points of (k−1)NT+(L−1)(M+P)T, (k−1)NT+(L−1)(M+P)T+T, (k−1)NT+(L−1)(M+P)T+2T, . . . , (k−1)NT+(L−1)(M+P)T+MT.

In the application example 2, the advantages of the transmission patterns of the discovery signals are flexible configuration, and able to adjust the transmission cycle N*T, the number of bursts transmitted in the cycle L as well as the number of subframes transmitted within a burst M according to the cell discovery needs and the transmit power limit.

Application Example 3

The activated cell is configured to use a transmission pattern of continuously transmitting the discovery signals, and the parameter required to be configured is: transmission cycle T.

The dormant cell is configured to use a transmission pattern of intermittently transmitting the discovery signals, and the parameters required to be configured is: the minimum transmission gap T, the transmission cycle N (the actual cycle is N*T), the number of bursts transmitted in each cycle L, the number of subframes carrying the discovery signals in each burst M, the gap between adjacent bursts P (the actual gap is P*T).

According to the abovementioned parameter configuration, the pattern of the discovery signals of the activated cell is shown in FIG. 2, it transmits the discovery signals at the time points of 0, T, 2T, . . . , NT, (N+1)T, (N+2)T, . . . , 2NT, (2N+1)T, (2N+2)T, . . . .

The pattern of the discovery signals of the dormant cell is shown in FIG. 3, and it is the same as the transmission pattern in the application example 2 and will not be repeated here.

In this application example, the advantages of the transmission pattern of the discovery signals is the flexible configuration, the power restrictions of the activated cell are relatively loose, and a relatively large number of discovery signals can be sent for UE discovering and selecting an activated cell to serve itself; while the power restrictions of the dormant cell are more stringent, and according to the cell discovery needs, it can flexibly adjust the transmission cycle N*T, the number of bursts transmitted in a cycle L and the number of subframes transmitted in a burst M.

Application Example 4

Figure 4:
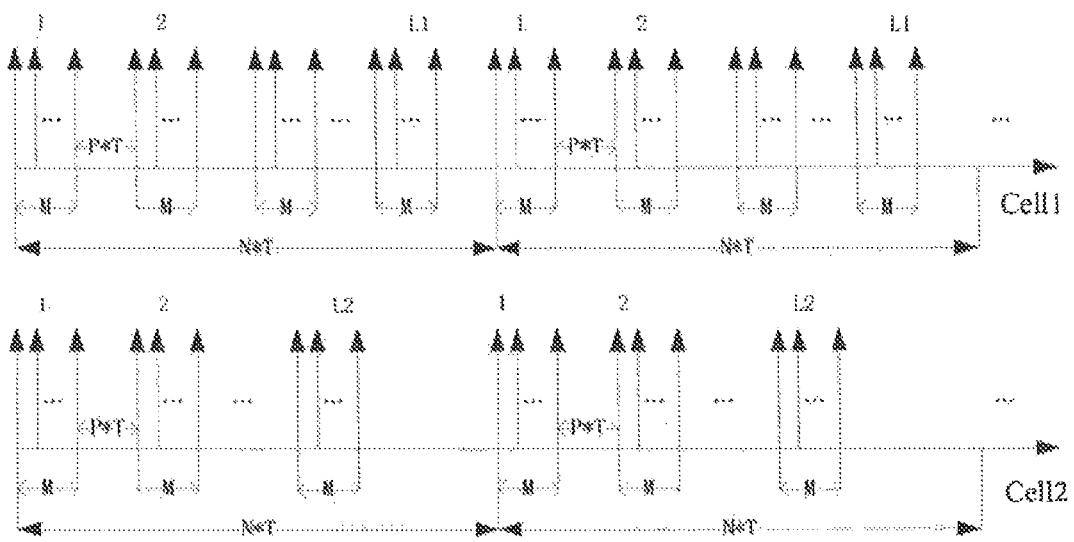
FIG. 4 is a schematic diagram of a transmission pattern in which different cells correspond to different transmission patterns of discovery signals.

Different dormant cells can also be configured to use different patterns of the discovery signals, for example transmitting a different number of bursts in each cycle, or transmitting a different number of frames carrying the discovery signals in each burst. As shown in FIG. 4;

The dormant cell 1 is configured to use a pattern of intermittently transmitting the discovery signals, and the parameters required to be configured are: the minimum transmission gap T, the transmission cycle N (the actual cycle is N*T), the number of bursts transmitted in each cycle L1, the number of subframes carrying the discovery signals in each burst M1, the gap between the adjacent bursts P (the actual gap is P*T).

The dormant cell 2 is configured to use a pattern of intermittently transmitting the discovery signals, and the parameters required to be configured are: the minimum transmission gap T, the transmission cycle N (the actual cycle is N*T), the number of bursts transmitted in each cycle L2, the number of subframes carrying the discovery signals in each burst M2, and the gap between adjacent bursts P (the actual gap is P*T).

The advantages of the transmission patterns of the discovery signals in the application example are: different dormant cells may have different power limits and cell discovery needs, therefore, they can be configured with different transmission cycles, different numbers of bursts transmitted in a cycle, and different numbers of subframes transmitted in each burst.

Application Example 5

Figure 5:
FIG. 5 is a schematic diagram of respective cells transmitting the discovery signals at the same position.
Figure 5:
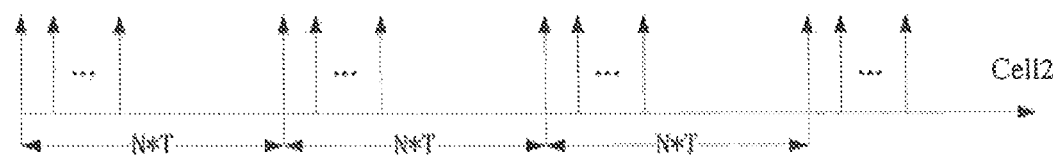
Figure 5:
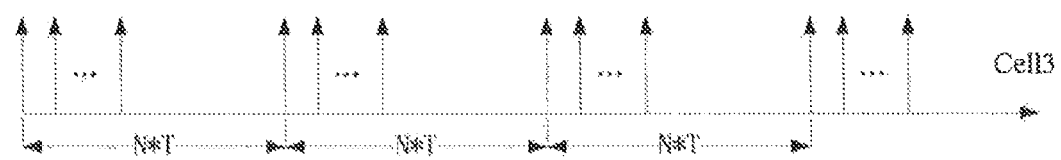

In the application example, each cell may transmit discovery signals at the same starting position to make the subsequent processing easier, as shown in FIG. 5 (take the intermittent transmission solution of transmitting one burst in one cycle for example), each cell:

transmits the discovery signals at the time points of 0, T, 2T, . . . , MT within the first cycle;

transmits the discovery signals at the time points of NT, NT+T, NT+2T, . . . , NT+MT within the second cycle;

transmits the discovery signals at the time points of (k−1)NT, (k−1)NT+T, (k−1)NT+2T, . . . , NT+MT with the k-th cycle;

. . .

The transmission patterns of discovery signals in the application example are applicable to intra-frequency cells and are conducive for a UE measuring these cells at the same position, so that the operation is easy.

Figure 6:
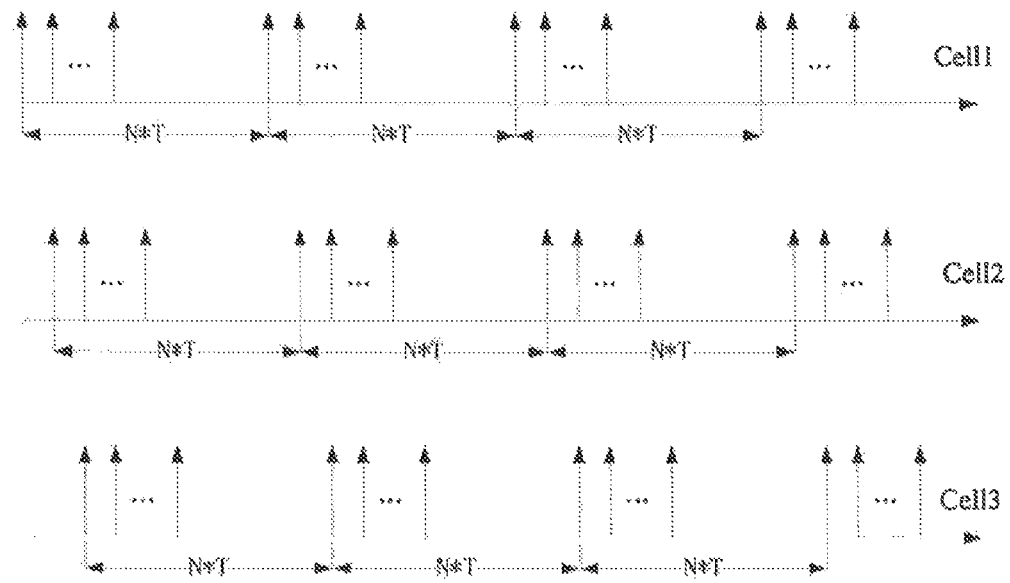
FIG. 6 is a schematic diagram of the respective cells transmitting discovery signals with different position offsets.

In an alternative solution, each cell can be configured to use a different starting position offset to transmit the discovery signals to avoid interference. As shown in FIG. 6 (take the intermittent transmission solution of transmitting one burst within one cycle for example).

That is, the cell 1:

transmits the discovery signals at the time points of 0, T, 2T, . . . , MT within the first cycle;

transmits the discovery signals at the time points of NT, NT+T, NT+2T, . . . , NT+MT within the second cycle;

transmits the discovery signals at the time points of (k−1)NT, (k−1)NT+T, (k−1)NT+2T, . . . , NT+MT within the k-th cycle;

. . .

the cell 2:

transmits the discovery signals at the time points of T, 2T, 3T, . . . , (M+1)T within the first cycle;

transmits the discovery signals at the time points of NT+T, NT+2T, NT+3T, . . . , NT+(M+1)T within the second cycle;

transmits the discovery signals at the time points of (k−1)NT+T, (k−1)NT+2T, (k−1)NT+3T, . . . , NT+(M+1)T within the k-th cycle;

. . .

the cell 3:

transmits the discovery signals at the time points of 2T, 3T, 4T, . . . , (M+2)T within the first cycle;

transmits the discovery signals at the time points of NT+2T, NT+3T, NT+4T, . . . , NT+(M+2)T within the second cycle;

transmits the discovery signals at the time points of (k−1)NT+2T, (k−1)NT+3T, (k−1)NT+4T, . . . , NT+(M+2)T within the k-th cycle;

. . .

The cases of other cells can be obtained in the similar manner.

The transmission patterns of discovery signals in the application example are applicable to inter-frequency cells and are conducive for the UE measuring these cells at different positions, so as to avoid stopping transmitting at the same time.

Hereinafter, in conjunction with the accompanying drawings and application examples, the measurement patterns are described in detail:

In particular, take there being three cells and each cell having three UEs for example, the cell 1 has UE11, UE12 and UE13, the cell 2 has UE21, UE22 and UE23 and the cell 3 has UE31, UE32 and UE33. The cell 2 and the cell 1 are intra-frequency, and the cell 3 and the cell 1 are inter-frequency.

Application Example 6

Figure 7:
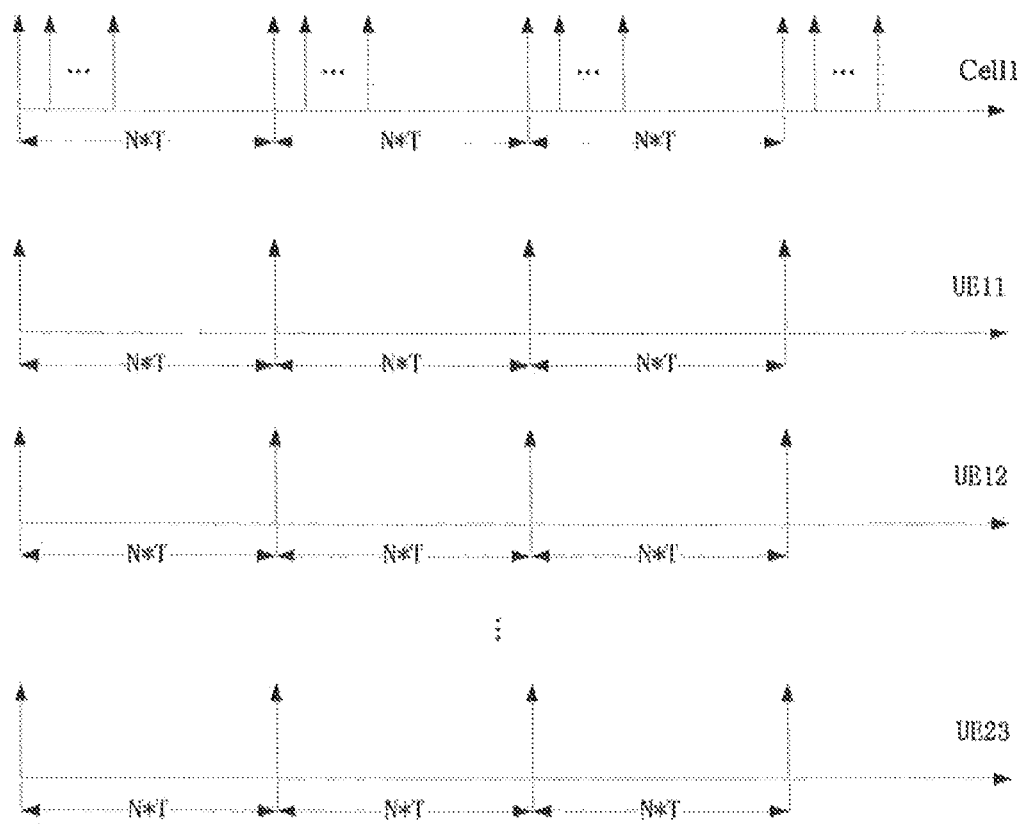
FIG. 7 is a schematic diagram of different UEs using the same measurement pattern.

For the intra-frequency measurement, different UEs may use the same measurement pattern for measuring, as shown in FIG. 7.

Take the intermittent transmission solution of transmitting one burst in one cycle for example, the cell 1:

transmits the discovery signals at the time points of 0, T, 2T, . . . , MT within the first cycle;

transmits the discovery signals at the time points of NT, NT+T, NT+2T, . . . , NT+MT within the second cycle;

transmits the discovery signals at the time points of (k−1)NT, (k−1)NT+T, (k−1)NT+2T, . . . , NT+MT within the k-th cycle;

. . .

the UE11, the UE12, the UE13, the UE21, the UE22 and the UE23 can be configured to use the same measurement pattern to measure the cell 1:

measuring the discovery signals at the time point of 0 in the first cycle;

measuring the discovery signals at the time point of NT in the second cycle;

measuring the discovery signals at the time point of (k−1)NT in the k-th cycle;

The measurement pattern configuration method in the present application example is conducive to the unified operation of the respective UEs, and the network side centrally processes the measurement result.

Application Example 7

Figure 8:
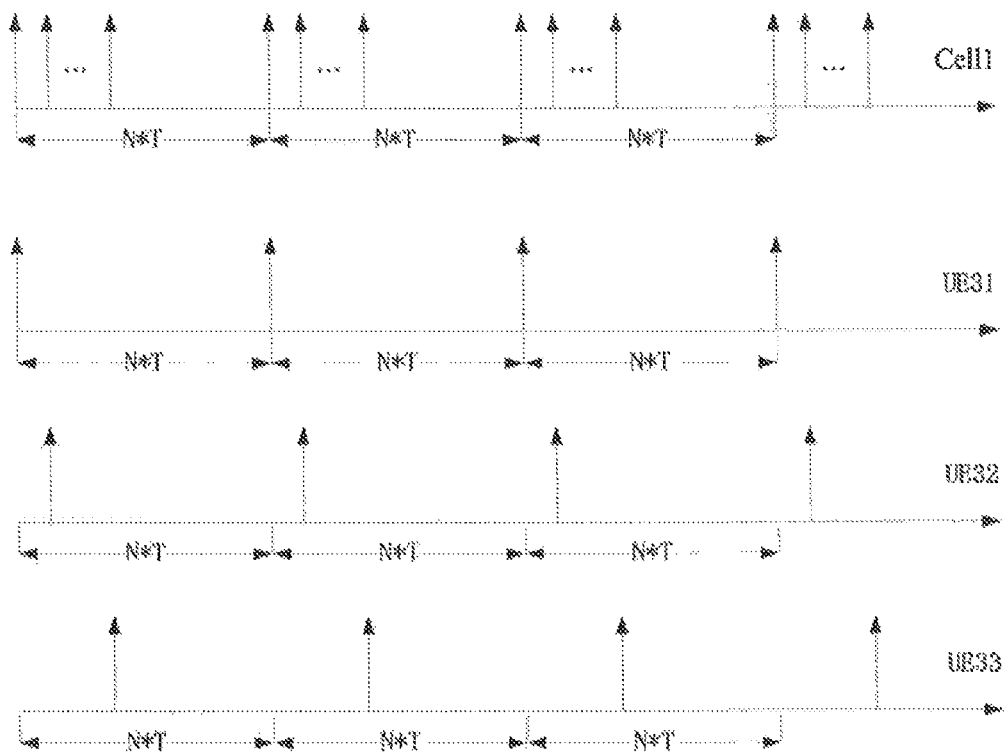
FIG. 8 is a schematic diagram of different UE using different measurement patterns.

For the inter-frequency measurement, different UEs can use different measurement patterns to measure, the respective UEs can be configured to use measurement patterns staggered from each other in order to avoid that the respective UEs stop transmitting simultaneously in a measurement gap, as shown in FIG. 8.

Take an intermittent transmission solution of transmitting one burst within one cycle for example, the cell 1:

transmits the discovery signals at the time points of 0, T, 2T, . . . , MT within the first cycle;

transmits the discovery signals at the time points of NT, NT+T, NT+2T, . . . , NT+MT within the second cycle;

transmits the discovery signals at the time points of (k−1)NT, (k−1)NT+T, (k−1)NT+2T, . . . , NT+MT within the k-th cycle;

. . .

The three UEs in the cell 3: UE31, UE32, UE33, measure the DS of the cell 1, and they all belong to the inter-frequency measurement, and each UE can be configured to measure different bursts or subframes in one cycle to achieve the purpose that the measurement patterns of the respective UEs are staggered from each other.

The UE31 measures the discovery signals at the time point of 0 within the first cycle;
    measures the discovery signals at the time point of NT within the second cycle;
    measures the discovery signals at the time point of (k−1)NT within the k-th cycle;
    . . .

The UE32 measures the discovery signals at the time point of T within the first cycle;
    measures the discovery signals at the time point of NT+T within the second cycle;
    measures the discovery signals at the time point of (k−1)NT+T within the k-th cycle;
    . . .

The UE33
    measures the discovery signals at the time point of 2T in the first cycle;
    measures the discovery signals at the time point of NT+2T in the second cycle;
    measures the discovery signals at the time point of (k−1)NT+2T in the k-th cycle;
    . . .

In the present application example, the measurement pattern configuration method is conducive to respective UEs staggering their measuring patterns, while avoiding that the respective UEs stop transmitting at the same time for measuring, which results in a reduced spectrum efficiency, thereby improving the network spectrum efficiency.

Application Example 8

There are different measurement needs for the UE performing a presence/absence detection and intensity detection of the DS, and the number of samples required in the presence/absence detection is relatively small while the number of samples required in the intensity detection is relatively large and the filtering time is longer.

The transmission pattern of the discovery signal in the cell 1 is configured as the minimum transmission gap T, the transmission cycle N (the actual cycle is N*T), the number of bursts transmitted in each cycle L, the number of subframes in each burst M and the gap P between adjacent bursts (the actual gap is P*T).

Figure 9:
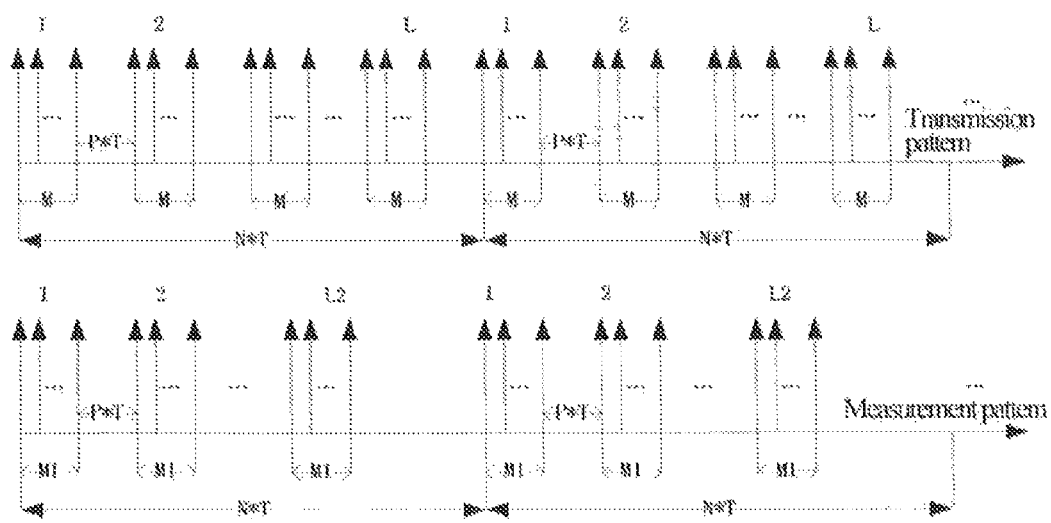
FIG. 9 is a schematic diagram of a measurement pattern configuration of discovery signals.

For each UE, it can be configured with the number of bursts measured within each cycle L1 (L1 is an arbitrary integer less than or equal to L), the number of subframes measured in each burst M1 (M1 is an arbitrary integer less than or equal to M), and reporting one measurement result after measuring for S cycles, and in order to reduce the reporting overhead, one threshold value can be configured, and only when the measurement intensity or signal intensity of the discovery signals exceeds the configured threshold, the measurement reporting is performed. As shown in FIG. 9, the UE will:
    within the first cycle 0~NT:
    the first burst: measure the discovery signals at the time points of 0, T, 2T, . . . , M1T;
    the second burst: measure the discovery signals at the time points of (M+P)T, (M+P)T+T, (M+P)T+2T, . . . , (M+P)T+M1T;
    the L1-th burst: measure the discovery signals at the time points of (L1−1)(M+P)T, (L1−1)(M+P)T+T, (L1−1)(M+P)T+2T, . . . , (L1−1)(M+P)T+M1T;
    within the second cycle NT~2NT:
    the first burst: measure the discovery signals at the time points of NT, NT+T, NT+2T, . . . , NT+M1T;
    the second burst: measure the discovery signals at the time points of NT+(M+P)T, NT+(M+P)T+T, NT+(M+P)T+2T, . . . , NT+(M+P)T+M1T;
    the L1-th burst: measure the discovery signals at the time points of NT+(L1−1)(M+P)T, NT+(L1−1)(M+P)T+T, NT+(L1−1)(M+P)T+2T, . . . , NT+(L1−1)(M+P)T+M1T;
    within the k-th cycle (k−1)NT~kNT:
    the first burst: measure the discovery signals at the time points of (k−1)NT, (k−1)NT+T, (k−1)NT+2T, . . . , (k−1)NT+M1T;
    the second burst: measure the discovery signals at the time points of (k−1)NT+(M+P)T, (k−1)NT+(M+P)T+T, (k−1)NT+(M+P)T+2T, . . . , (k−1)NT+(M+P)T+M1T;
    the L1-th burst: measure the discovery signals at the time points of (k−1)NT+(L1−1)(M+P)T, (k−1)NT+(L1−1)(M+P)T+T, (k−1)NT+(L1−1)(M+P)T+2T, . . . , (k−1)NT+(L1−1)(M+P)T+M1T;

The UE may provide one DS measurement result at the time point of (S−1)NT after S measurement cycles.

Application Example 9

In this application example, the UE21 performs the presence/absence detection on the cell 1, and measures one burst in each cycle, and measures two subframes in each burst, for example, the UE21:
    measures the discovery signals at the time points of 0 and T within the first cycle;
    measures the discovery signals at the time points of NT and NT+T within the second cycle;
    measures the discovery signals at the time points of (k−1)NT and (k−1)NT+T within the k-th cycle;
    . . .

The UE can output one measurement result of the presence/absence detection in each measurement cycle NT.

The UE22 performs a quantitative detection on the cell 1, measures two bursts each cycle and 4 subframes each burst, for example, the UE22 will:
    within the first cycle 0~NT:
    the first burst: measure the discovery signals at the time points of 0, T, 2T, 3T;
    the second burst: measure the discovery signals at the time points of (M+P)T, (M+P)T+T, (M+P)T+2T, (M+P)T+3T;
    within the second cycle NT~2NT:
    the first burst: measure the discovery signals at the time points of NT, NT+T, NT+2T, NT+3T;
    the second burst: measure the discovery signals at the time points of NT+(M+P)T, NT+(M+P)T+T, NT+(M+P)T+2T, NT+(M+P)T+3T;
    within the k-th cycle (k−1)NT~kNT:
    the first burst: measure the discovery signals at the time points of (k−1)NT, (k−1)NT+T, (k−1)NT+2T, (k−1)NT+3T;
    the second burst: measure the discovery signals at the time points of (k−1)NT+(M+P)T, (k−1)NT+(M+P)T+T, (k−1)NT+(M+P)T+2T, (k−1)NT+(M+P)T+3T.

Figure 10:
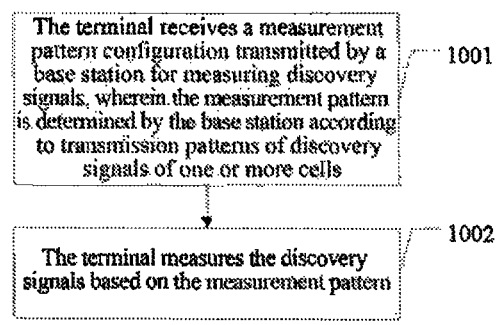
FIG. 10 is a schematic diagram of a second discovery signal measurement method embodiment in accordance with the present invention.

In the following, the method according to the embodiment of the present invention will be described from the perspective of terminal:
    as shown in FIG. 10, the discovery signal measurement method embodiment of the present invention comprises:
    in step 1001: the terminal receives a measurement pattern configuration transmitted by a base station for measuring discovery signals, wherein the measurement pattern is determined by the base station according to transmission patterns of discovery signals of one or more cells;

alternatively, the measurement pattern of the terminal comprises information used for measuring discovery signals of all the cells corresponding to the base station.

Measurement patterns of different terminals comply with at least one of the following situations:

in an intra-frequency measurement, measurement patterns of different terminals are the same;

in an inter-frequency measurement, measurement patterns of different terminals are the same;

in the intra-frequency measurement, measurement patterns of different terminals are different, and measured bursts or subframes are staggered from each other in one cycle; and in the inter-frequency measurement, measured bursts or subframes of the measurement patterns of different terminals in one cycle are staggered from each other.

Alternatively, the measurement patterns of different terminals are the same in the intra-frequency measurement; the measurement patterns of different terminals are different in the inter-frequency measurement.

The measurement pattern comprises information used for indicating the following content:

the number of bursts measured in each cycle, the number of subframes measured in each burst; the number of cycles of measurement needed for reporting a measurement result.

In step 1002: the terminal measures the discovery signals based on the measurement pattern.

Figure 11:
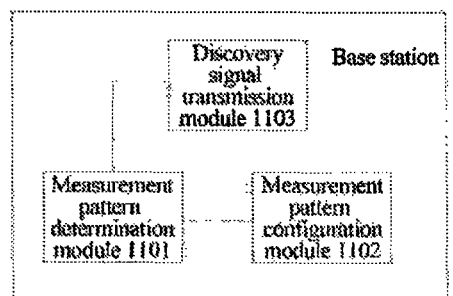
FIG. 11 is a schematic diagram of a module structure of a base station in accordance with an embodiment of the present invention.

In order to realize the abovementioned method, the embodiment of the present invention further provides a base station, as shown in FIG. 11, the base station comprises: a measurement pattern determination module 1101, a measurement pattern configuration module 1102 and a discovery signal transmission module 1103, wherein, the measurement pattern determination module 1101 is configured to: determine measurement patterns used for measuring discovery signals for different terminals according to transmission patterns of discovery signals of one or more cells;

the measurement pattern configuration module 1102 is configured to: configure measurement patterns corresponding to the terminals for different terminals; and the discovery signal transmission module 1103 is configured to:

transmit the discovery signals in the cells corresponding to the transmission patterns.

Alternatively, the base station is further configured to determine a transmission pattern through any of the following methods:

(1) the base station determining independently; or, (2) receiving a configuration signaling transmitted by a central node base station or other base stations other than the central node base station, configuring the transmission pattern according to the configuration signaling, wherein the transmission pattern is centrally determined by the central node base station, or determined coordinately by the central node base station and other base stations other than the central node base station.

Alternatively, the transmission pattern indicates that a transmission mode of the discovery signal comprises:

continuously transmitting the discovery signals according to a predetermined transmission cycle; or;

transmitting a predetermined number of bursts in one cycle, transmitting a predetermined number of subframes s in each burst, and a gap between adjacent bursts is a predetermined value.

Alternatively, transmission patterns of different cells comply with at least one of the following situations:

the transmission pattern corresponding to an activated cell and the transmission pattern corresponding to a dormant cell are the same, and both indicate that the discovery signals are transmitted intermittently;

the transmission pattern corresponding to an activated cell indicates that the discovery signals are transmitted continuously, the transmission pattern corresponding to a dormant cell indicates that the discovery signals are transmitted intermittently;

the transmission pattern corresponding to an activated cell and the transmission pattern corresponding to a dormant cell are different, and both indicate that the discovery signals are transmitted intermittently; and transmission patterns corresponding to different cells indicate that starting position offsets of starting to transmit the discovery signals are different.

Alternatively, the transmission patterns being different means that at least one of the following information in the transmission patterns is different:

a cycle of transmitting discovery signals in the corresponding cell;

the number of bursts transmitted in each cycle;

the number of subframes transmitted in each burst;

a gap between adjacent bursts;

starting position offset of starting to transmit the discovery signals.

Alternatively, the base station determines measurement patterns of the terminals based on the measurement needs, and the measurement needs comprise qualitative measurement needs and/or quantitative measurement needs.

Alternatively, the measurement patterns of the terminals comprise measurement patterns used for measuring discovery signals of one or more cells, and measurement patterns used by the terminals for measuring discovery signal of one cell are the full set or subset of transmission patterns used by the base station for transmitting the discovery signals of the cell.

Figure 12:
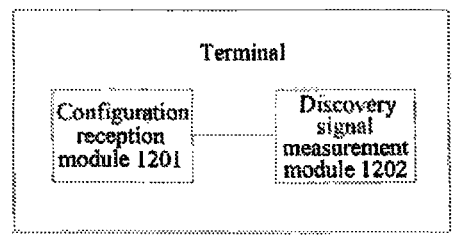
FIG. 12 is a schematic diagram of a module structure of a terminal in accordance with an embodiment of the present invention.

In order to realize the abovementioned method, the embodiment of the present invention further provides a terminal embodiment, as shown in FIG. 12, the terminal in the embodiment comprises: a configuration reception module 1201 and a discovery signal measurement module 1202, wherein, the configuration reception module 1201 is configured to: receive a measurement pattern configuration transmitted by a base station for measuring the discovery signals, wherein the measurement pattern is determined by the base station according to transmission patterns of discovery signals of one or more cells;

the discovery signal measurement module 1202 is configured to: measure discovery signals based on the measurement patterns.

Alternatively, the measurement patterns of the terminals comprise information used for measuring discovery signals of all the cells corresponding to the base station.

Alternatively, the measurement patterns of different terminals comply with at least one of the following situations:

in an intra-frequency measurement, measurement patterns of different terminals are the same;

in an inter-frequency measurement, measurement patterns of different terminals are the same;

in the intra-frequency measurement, measurement patterns of different terminals are different, measured bursts or subframes in one cycle are staggered from each other; and in the inter-frequency measurement, measured bursts or subframes of the measurement patterns of different terminals in one cycle are staggered from each other.

Alternatively, the measurement patterns of different terminals are the same in the intra-frequency measurement; the measurement patterns of different terminals are different in the inter-frequency measurement.

Alternatively, the measurement pattern comprises information used for indicating the following content:

the number of bursts measured in each cycle, the number of subframes measured in each burst; the number of cycles of measurement needed for reporting a measurement result.

Compared to the related art, the discovery signal measurement method, base station and terminal according to the embodiment of the present invention provide a definite realization solution of determining measurement patterns used by terminals for measuring the discovery signals according to the transmission patterns of the discovery signals and configuring the terminals with measurement patterns, and it also facilitate the terminals measuring the discovery signals transmitted by each base station, to meet the measurement needs of the terminals.

The measurement patterns used by the terminal for measuring the discovery signals of one cell are a full set or subset of transmission patterns used by the base station for transmitting the discovery signals of the cell, and it can guarantee that there must be discovery signals transmitted at the corresponding position when measuring based on the measurement patterns, thus increasing the measurement efficiency.

In addition, the base station can flexibly configure the measurement patterns according to different measurement needs, on the one hand, it can meet the measurement needs of different UEs, and on the other hand, it is conducive for each UE rationally planning the measurement gap, to avoid that a large number of UEs stop transmitting simultaneously in the inter-frequency measurement, thereby increasing the spectral efficiency.

No matter whether the base station independently determines the transmission pattern or the central node base station centrally determines or it is coordinated with other base stations to determine, it can ensure the flexibility of transmission patterns and avoid interference between the transmission patterns of the discovery signals of the respective base stations.

Those ordinarily skilled in the art can understand that all or some of steps of the abovementioned method may be completed by the programs instructing the relevant hardware, and the programs may be stored in a computer-readable storage medium, such as read only memory, magnetic or optical disk. Alternatively, all or some of the steps of the abovementioned embodiments may also be implemented by using one or more integrated circuits. Accordingly, each module/unit in the abovementioned embodiments may be realized in a form of hardware, or in a form of software function modules. The patent document is not limited to any specific form of hardware and software combinations.

The modules described in the embodiments of the present invention are only an example divided according to their functions, and understandably, in the case that a system/apparatus/device achieves the same functions, one skilled in the art can provide one or more other function division methods, in a specific application, any one or more functional modules therein can be achieved with one functional entity apparatus or unit, undeniably, the above transformations are within the protection scope of the present application.

Obviously, the described embodiments are merely part of embodiments of the present invention, but not all the embodiments. Based on the embodiments of the present invention, all other embodiments obtained by those of ordinary skill under the premise of without creative work, belong to the protection scope of the patent document.

INDUSTRIAL APPLICABILITY

The discovery signal measurement method, base station and terminal in the embodiment of the present invention provide a definite implementation solution for determining measurement patterns used by terminals for measuring discovery signals according to the transmission patterns of the discovery signals and configuring the terminals with measurement patterns, so as to facilitate the terminals measuring the discovery signals transmitted by each base station and to meet the measurement needs of the terminals. Therefore, it has relatively strong industrial applicability.

What is claimed is:

1. A measurement method for discovery signals, comprising:
a base station determining measurement patterns used for measuring discovery signals for different terminals according to transmission patterns of discovery signals of one or more cells, comprising: determining the transmission pattern of the discovery signals in a to-be-measured cell is configured as a minimum transmission gap being T, a transmission cycle being N*T, the number of bursts transmitted in each cycle being L, the number of subframes carrying the discovery signals in each burst being M, and the gap between adjacent bursts being P*T, for each terminal, configuring the number of bursts measured within each cycle as L1, the number of subframes carrying the discovery signals measured in each burst as M1, and reporting one measurement result after measuring for S cycles, wherein L1 is an arbitrary integer less than or equal to L, and M1 is an arbitrary integer less than or equal to M;
the base station configuring measurement patterns corresponding to the terminals for different terminals; and
the base station transmitting the discovery signals in cells corresponding to the transmission patterns, and the terminals measuring the discovery signals according to the configured measurement patterns.

2. The measurement method of claim 1, wherein, before the step of the base station determining measurement patterns used for measuring discovery signals for different terminals according to transmission patterns of discovery signals of one or more cells, the method further comprises:
the base station determining the transmission patterns through any of following methods:
the base station determining independently; or,
receiving a configuration signaling sent by a central node base station or other base stations other than the central node base station, configuring the transmission patterns according to the configuration signaling, wherein the transmission patterns are centrally determined by the central node base station, or determined coordinately by the central node base station and other base stations other than the central node base station.

3. The measurement method of claim 1, wherein a transmission mode of the discovery signals comprises:
continuously transmitting discovery signals according to a predetermined transmission cycle; or;
transmitting a predetermined number of bursts in one cycle, and transmitting a predetermined number of subframes carrying the discovery signals in each burst, and a gap between adjacent bursts is a predetermined value.

4. The measurement method of claim 1, wherein, transmission patterns of different cells comply with at least one of following situations:
a transmission pattern corresponding to an activated cell and a transmission pattern corresponding to a dormant cell are the same, and both indicate that the discovery signals are transmitted intermittently;
the transmission pattern corresponding to the activated cell indicates that the discovery signals are transmitted continuously, and the transmission pattern corresponding to the dormant cell indicates that the discovery signals are transmitted intermittently;
the transmission pattern corresponding to the activated cell and the transmission pattern corresponding to the dormant cell are different, and both indicate that the discovery signals are transmitted intermittently; and
transmission patterns of corresponding different cells indicate that starting position offsets of starting to transmit the discovery signals are different.

5. The measurement method of claim 4, wherein, the transmission patterns being different means that at least one of following information in the transmission patterns is different:
a cycle of transmitting discovery signals in a corresponding cell;
the number of bursts transmitted in each cycle;
the number of subframes carrying the discovery signals transmitted in each burst;
a gap between adjacent bursts;
starting position offset of starting to transmit the discovery signals; and
occupied frequency resources and/or sequence resources.

6. The measurement method of claim 1, wherein, the step of the base station determining measurement patterns used for measuring discovery signals for different terminals according to transmission patterns of discovery signals of one or more cells comprises:
the base station determining measurement patterns of different terminals based on measurement needs, wherein the measurement needs comprise qualitative measurement needs and/or quantitative measurement needs.

7. The measurement method of claim 1, wherein, the measurement patterns of the terminals comprise measurement patterns used for measuring discovery signals of one or more cells, and measurement patterns used by the terminals for measuring discovery signals of one cell are a full set or subset of transmission patterns used by the base station for transmitting discovery signals of the cell.

8. A measurement method for discovery signals, comprising:
a terminal receiving a measurement pattern configuration transmitted by a base station for measuring discovery signals, wherein the measurement pattern is determined by the base station according to transmission patterns of discovery signals of one or more cells; and
the terminal measuring the discovery signals based on the measurement pattern;
wherein the measurement pattern configuration transmitted by the base station comprises:
determining the transmission pattern of the discovery signals in a to-be-measured cell is configured as a minimum transmission gap being T, a transmission cycle being N*T, the number of bursts transmitted in each cycle being L, the number of subframes carrying the discovery signals in each burst being M, and the gap between adjacent bursts being P*T, for each terminal, configuring the number of bursts measured within each cycle as L1, the number of subframes carrying the discovery signals measured in each burst as M1, and reporting one measurement result after measuring for S cycles, wherein L1 is an arbitrary integer less than or equal to L, and M1 is an arbitrary integer less than or equal to M.

9. The measurement method of claim 8, wherein, the measurement pattern of the terminal comprises information used for measuring discovery signals of all cells corresponding to the base station.

10. The measurement method of claim 8, wherein, measurement patterns of different terminals comply with at least one of following situations:
in an intra-frequency measurement, measurement patterns of different terminals are the same;
in an inter-frequency measurement, measurement patterns of different terminals are the same;
in the intra-frequency measurement, measurement patterns of different terminals are different, and measured bursts or subframes are staggered from each other in one cycle; and
in the inter-frequency measurement, measured bursts or subframes of the measurement patterns of different terminals in one cycle are staggered from each other.

11. A base station, comprising at least one processor executing a measurement pattern determination module, a measurement pattern configuration module and a discovery signal transmission module, wherein,
the measurement pattern determination module is configured to: determine measurement patterns used for measuring discovery signals for different terminals according to transmission patterns of discovery signals of one or more cells by: determining the transmission pattern of the discovery signals in a to-be-measured cell is configured as a minimum transmission gap being T, a transmission cycle being N*T, the number of bursts transmitted in each cycle being L, the number of subframes carrying the discovery signals in each burst being M, and the gap between adjacent bursts being P*T, for each terminal, configuring the number of bursts measured within each cycle as L1, the number of subframes carrying the discovery signals measured in each burst as M1, and reporting one measurement result after measuring for S cycles, wherein L1 is an arbitrary integer less than or equal to L, and M1 is an arbitrary integer less than or equal to M;
the measurement pattern configuration module is configured to: configure measurement patterns corresponding to the terminals for different terminals; and
the discovery signal transmission module is configured to: transmit the discovery signals in cells corresponding to the transmission patterns.

12. The base station of claim 11, wherein,
the base station is further configured to determine the transmission pattern through any of following methods:
the base station determining independently; or, receiving a configuration signaling sent by a central node base station or other base stations other than the central node base station, configuring the transmission pattern according to the configuration signaling, wherein the transmission pattern is centrally determined by the central node base station, or determined coordinately by the central node base station and other base stations other than the central node base station.

13. The base station of claim 11, wherein, the transmission pattern indicates that a transmission mode of the discovery signal comprises:
continuously transmitting the discovery signals according to a predetermined transmission cycle; or;
transmitting a predetermined number of bursts in one cycle, transmitting a predetermined number of subframes carrying discovery signals in each burst, and a gap between adjacent bursts is a predetermined value.

14. The base station of claim 11, wherein, transmission patterns of different cells comply with at least one of following situations:
a transmission pattern corresponding to an activated cell and a transmission pattern corresponding to a dormant cell are the same, and both indicate that the discovery signals are transmitted intermittently;
the transmission pattern corresponding to the activated cell indicates that the discovery signals are transmitted continuously, and the transmission pattern corresponding to the dormant cell indicates that the discovery signals are transmitted intermittently;
the transmission pattern corresponding to the activated cell and the transmission pattern corresponding to the dormant cell are different, and both indicate that the discovery signals are transmitted intermittently; and
transmission patterns of corresponding different cells indicate that starting position offsets of starting to transmit the discovery signals are different.

15. The base station of claim 14, wherein, the transmission patterns being different means that at least one of following information in the transmission patterns is different:
a cycle of transmitting discovery signals in a corresponding cell;
the number of bursts transmitted in each cycle;
the number of subframes carrying the discovery signals transmitted in each burst;
a gap between adjacent bursts;
starting position offset of starting to transmit the discovery signals; and
occupied frequency resources and/or sequence resources.

16. The base station of claim 11, wherein, the base station is configured to determine measurement patterns used for measuring discovery signals for different terminals according to transmission patterns of discovery signals of one or more cells in a following way:
determining measurement patterns of the terminals based on measurement needs, wherein the measurement needs comprise qualitative measurement needs and/or quantitative measurement needs.

17. The base station of claim 11, wherein, the measurement patterns of the terminals comprise measurement patterns used for measuring discovery signals of one or more cells, measurement patterns used by the terminals for measuring discovery signals of one cell are a full set or subset of transmission patterns used by the base station for transmitting the discovery signals of the cell.

18. A terminal, comprising at least one processor executing a configuration reception module and a discovery signal measurement module, wherein,
the configuration reception module is configured to: receive a measurement pattern configuration transmitted by a base station for measuring discovery signals, wherein the measurement pattern is determined by the base station according to transmission patterns of discovery signals of one or more cells; and
the discovery signal measurement module is configured to: measure discovery signals based on the measurement patterns;
wherein the measurement pattern configuration transmitted by the base station comprises:
determining the transmission pattern of the discovery signals in a to-be-measured cell is configured as a minimum transmission gap being T, a transmission cycle being N*T, the number of bursts transmitted in each cycle being L, the number of subframes carrying the discovery signals in each burst being M, and the gap between adjacent bursts being P*T, configuring the number of bursts measured within each cycle as L1, the number of subframes carrying the discovery signals measured in each burst as M1, and reporting one measurement result after measuring for S cycles, wherein L1 is an arbitrary integer less than or equal to L, and M1 is an arbitrary integer less than or equal to M.

19. The terminal of claim 18, wherein, the measurement patterns of the terminals comprise information used for measuring discovery signals of all cells corresponding to the base station; or
the measurement patterns of different terminals comply with at least one of following situations:
in an intra-frequency measurement, measurement patterns of different terminals are the same;
in an inter-frequency measurement, measurement patterns of different terminals are the same;
in the intra-frequency measurement, measurement patterns of different terminals are different, measured bursts or subframes in one cycle are staggered from each other; and
in the inter-frequency measurement, measured bursts or subframes of the measurement patterns of different terminals in one cycle are staggered from each other.

* * * * *